(No Model.)
J. H. LUTHER.
Tool for Extracting Tubular Casings from Oil Wells.
No. 229,325.                    Patented June 29, 1880.
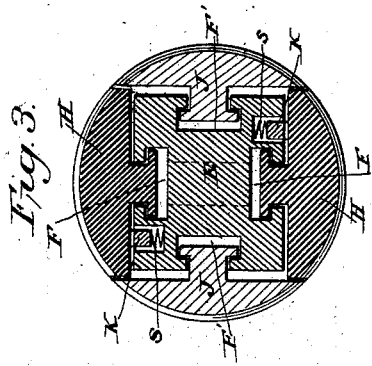
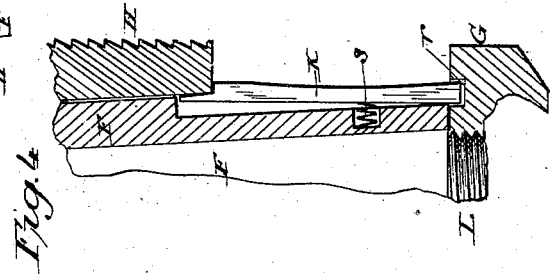
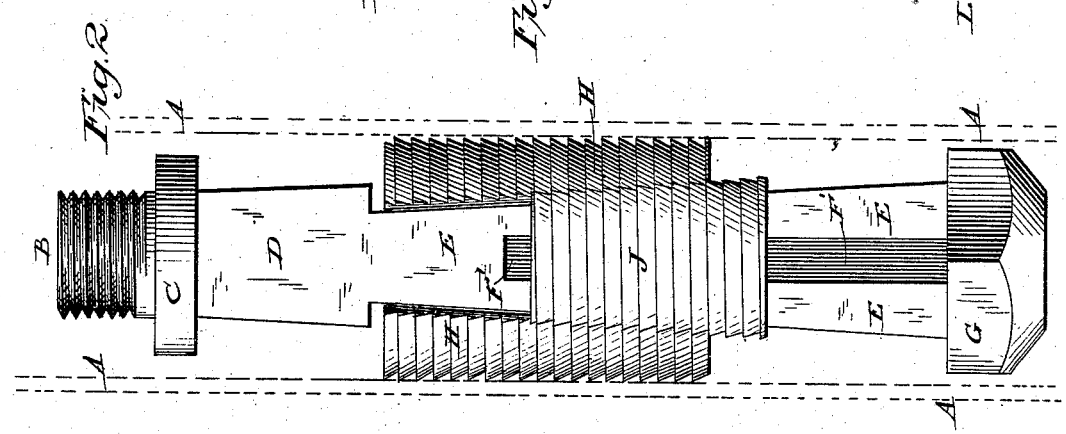
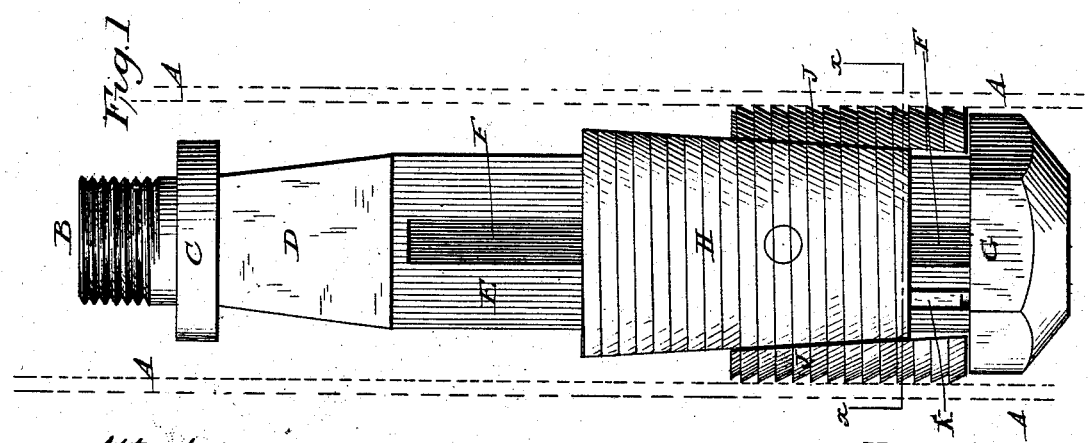
Attest.
Sidney P. Hollingsworth
Phil R. Stansbury
Inventor.
James H. Luther,
By his Attorneys,
Stansbury & Munn.

UNITED STATES PATENT OFFICE.

JAMES H. LUTHER, OF KARNS CITY, PENNSYLVANIA.

TOOL FOR EXTRACTING TUBULAR CASINGS FROM OIL-WELLS.

SPECIFICATION forming part of Letters Patent No. 229,325, dated June 29, 1880.

Application filed April 19, 1880. (No model.)

*To all whom it may concern:*

Be it known that I, JAMES H. LUTHER, of Karns City, in the State of Pennsylvania, have invented certain new and useful Improvements in Tools for Extracting Tubular Casings from Oil-Wells; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation of my improved casing-spear, presenting a face view of one of the larger pair of wickers. Fig. 2 is a side elevation of the same at right angles to Fig. 1, presenting a face view of one of the smaller pair of wickers. Fig. 3 is a horizontal section on line *x x* of Fig. 1. Fig. 4 is a detail view in section, showing one of the spring-dogs in its relation to the larger wicker.

The same part is indicated by the same letter wherever it occurs in the drawings.

My improvements relate to that class of casing-spears in which the wickers, after the introduction of the spear into the casing, are caused to expand and bear against the interior surface of the casing with such force that the casing can be lifted from the well by the spear without becoming detached therefrom.

These improvements consist in the arrangement upon the wedge-shaped stem of the spear of two pairs of wickers, one pair larger than the other pair, and arranged so that they can be expanded or thrown out to gripe the casing at any desired point in its length, and will then bear equally in a true circle against the entire interior circumference of the cylinder, and, in case the tool-rope breaks, will not lose their hold upon the casing, but retain their position within it, instead of falling to the bottom of the well, as not infrequently happens to the casing-spears heretofore in use, all as hereinafter more fully set forth.

In the accompanying drawings, which correctly represent the improved casing-spear, A marks in dotted lines the casing into which the spear is introduced. B is the screw by means of which the spear is attached to the drilling-tool. C is a collar, and D the neck of the tool, squared for the reception of the jaws of a wrench for screwing and unscrewing the spear and drilling-tool.

E is the stem of the spear, having the shape represented in Figs. 1 and 2, two of its sides being parallel to each other, as in Fig. 1, and two diverging as they descend, forming a wedge largest at its lower end, as shown in Fig. 2. The stem is threaded on its lower end at L, Fig. 4, for the reception of a screw-nut, G, provided with an annular recess on its upper face to receive the lower ends of the long spring-dogs or props K, as shown in Fig. 4.

H H are a pair of large wedge-shaped wickers, which slide up and down in slots F in the inclined faces of the stem E, being held thereto by the T-shaped heads, as shown in Fig. 3. These wickers are widest at their upper ends, and are held in their uppermost position by means of the spring-dogs K, which are pressed out by the springs *s*, and can be pressed back to release the wickers when it is desired to allow of their descent upon the stem.

J J are a pair of smaller wedge-shaped wickers, which slide up and down on the parallel faces of stem E. They are widest at their lower ends, and are held to the stem by T-heads, as shown in Fig. 3. Their lateral edges overlap the edges of wickers H. They are not provided with dogs, like the other pair.

The operation is a follows: The spear being introduced into the mouth of the casing, the dogs K are pressed back to allow the wickers H H to descend at will upon the stem E. The spear is dropped to the point at which it is desired to grasp the casing, when the spear is suddenly and forcibly drawn back, carrying the wickers J J up between the pair H H and forcing the teeth of both into the inner surface of the casing and causing them to expand, so as to take such firm hold on every side of the casing that it can be drawn out of the well without becoming detached from the spear. The binding-surface, it will be observed, is a perfect cylinder, coinciding with the interior surface of the casing.

If the casing cannot be raised, and it becomes desirable to detach the spear, a few downward blows are given with the "jars" until the stem E is driven down far enough between the wickers H H to allow the spring-dogs K K to fly out under their lower edges and support the wickers H H in their highest position, where they are withdrawn from contact with the interior of the casing. The same blows detach the wickers J J and cause them to fall to the bottom of the stem. The spear is then entirely released and may be easily withdrawn.

It will be observed that if the tool-rope should be broken by the strain in the effort to raise the casing the spear would not be released, but remain engaged with the casing until released in the manner above described.

I do not claim, broadly, a casing-spear in which sliding wickers are expanded by means of a wedge-shaped stem on which they traverse; but,

Having thus fully described my invention, what I claim, and desire to secure by Letters Patent, is—

1. A casing-spear having a wedge-shaped stem, upon which slide two unequal pairs of reversed wedge-shaped serrated wickers, the larger pair being provided with spring-dogs to support them in their highest position, the whole constructed, combined, and operating in the manner and for the purpose set forth.

2. The combination, with the stem E of a casing-spear, of the sliding wedge-shaped wickers H H and J J and the spring-dogs K K, all constructed and operating substantially as set forth.

3. In combination with the stem of a casing-spear, two pairs of wedge-shaped wickers, one pair larger than the other pair, and reversed as to their angles, so that the two pairs, when their edges are in juxtaposition, form a complete cylinder, which, when forced outward, bears upon and supports all portions of the interior surface of the casing that surround and come in contact with it, in the manner set forth.

4. The combination, with the spear-stem E, of the nut G, provided with the annular recess $r$, the dogs K K, and wickers H H, as and for the purpose specified.

5. A casing-spear in which the bearing or griping surface is an entire cylinder coinciding with the interior surface of the casing, and acting against and supporting it in all directions while the expanding force is applied, all as described.

In testimony that I claim the foregoing as my own invention I affix my signature in presence of two witnesses.

JAMES H. LUTHER.

Witnesses:
 GEO. F. GRAHAM,
 CHAS. F. STANSBURY.